(12) United States Patent
Hahnlen et al.

(10) Patent No.: US 11,760,043 B2
(45) Date of Patent: Sep. 19, 2023

(54) HIGH STRENGTH MECHANICAL FASTENING INCLUSIONS FOR FIBER REINFORCED POLYMER STRUCTURES

(71) Applicant: Honda Motor Co., Ltd., Tokyo (JP)

(72) Inventors: Ryan M. Hahnlen, Dublin, OH (US); Benjamin Adam Hoffman, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 606 days.

(21) Appl. No.: 15/720,409

(22) Filed: Sep. 29, 2017

(65) Prior Publication Data
US 2019/0099966 A1 Apr. 4, 2019

(51) Int. Cl.
*B29C 70/68* (2006.01)
*B23K 20/10* (2006.01)
(Continued)

(52) U.S. Cl.
CPC .............. *B29C 70/68* (2013.01); *B23K 20/10* (2013.01); *B23K 20/227* (2013.01); *B23K 20/233* (2013.01); *B29C 70/023* (2013.01); *B29C 70/72* (2013.01); *B32B 15/14* (2013.01); *F16B 5/02* (2013.01); *B23K 2101/18* (2018.08);
(Continued)

(58) Field of Classification Search
CPC ....... B29C 70/023; B29C 70/70; B29C 70/72; B29C 70/68; B32B 15/14; B23K 20/10; B23K 20/227; B23K 20/233; B23K 2103/16; B23K 2103/18; B23K 2103/04;
(Continued)

(56) References Cited

U.S. PATENT DOCUMENTS 3,753,205 A * 8/1973 Tuger ............... F16L 25/01
439/192
7,568,608 B1 * 8/2009 Ding ............... B23K 20/10
228/110.1
(Continued)

FOREIGN PATENT DOCUMENTS

| CN | 103386593 | 11/2013 | |
| DE | 102009024397 A1 * | 12/2010 | ........... B29C 70/885 |
| DE | 102015108850 | 12/2016 | |
| EP | 2754546 A1 * | 7/2014 | ............. B23K 20/10 |

OTHER PUBLICATIONS

Weber, "The Economics of Ultrasonics", Assembly Magazine (Aug. 1, 2003), https://www.assemblymag.com/articles/83104-the-economics-of-ultrasonics. (Year: 2003).*
(Continued)

*Primary Examiner* — Christopher W Raimund
(74) *Attorney, Agent, or Firm* — RANKIN, HILL & CLARK LLP

(57) ABSTRACT

A fastening inclusion is provided and includes a hard point made of coalesced metal sheets, metal or fiber flanges extending from edges of the hard point, and a fastener arranged on the hard point. The fastening inclusion can be incorporated into a fiber reinforced polymer structure by interleaving the flanges with fiber reinforced resin plies, and then curing the fiber reinforced plies to form a composite structure. The fastener on the hard point may be used for mechanically connecting the composite structure to a separate component, such as a metal component on a vehicle.

10 Claims, 4 Drawing Sheets

(51) Int. Cl.
| | |
|---|---|
| *F16B 5/02* | (2006.01) |
| *B32B 15/14* | (2006.01) |
| *B29C 70/02* | (2006.01) |
| *B23K 20/233* | (2006.01) |
| *B29C 70/72* | (2006.01) |
| *B23K 20/227* | (2006.01) |
| *B29L 31/00* | (2006.01) |
| *B29K 705/00* | (2006.01) |
| *F16B 37/04* | (2006.01) |
| *B23K 101/18* | (2006.01) |
| *B23K 103/04* | (2006.01) |
| *B23K 103/18* | (2006.01) |
| *B23K 103/16* | (2006.01) |

(52) U.S. Cl.
CPC ...... *B23K 2103/04* (2018.08); *B23K 2103/16* (2018.08); *B23K 2103/18* (2018.08); *B29K 2705/00* (2013.01); *B29L 2031/727* (2013.01); *F16B 37/048* (2013.01)

(58) Field of Classification Search
CPC ...... B23K 2101/18; F16B 5/02; F16B 37/048; B29K 2705/00; B29L 2031/727
See application file for complete search history.

(56) References Cited

U.S. PATENT DOCUMENTS

| | | | |
|---|---|---|---|
| 7,574,835 | B2 | 8/2009 | Bohlmann |
| 7,875,333 | B2 | 1/2011 | Stephan |
| 8,652,606 | B2 | 2/2014 | Griess et al. |
| 8,894,801 | B2 | 11/2014 | Griess et al. |
| 8,925,864 | B2 | 1/2015 | Sayilgan et al. |
| 8,993,084 | B2 | 3/2015 | Griess et al. |
| 9,522,512 | B2 | 12/2016 | Georgeson et al. |
| 2011/0031350 | A1* | 2/2011 | Sayilgan ............... B29C 70/885 244/131 |
| 2013/0129409 | A1 | 5/2013 | Cho et al. |
| 2015/0114071 | A1* | 4/2015 | Jones ................... B21D 31/04 72/363 |
| 2015/0129113 | A1 | 5/2015 | Griess et al. |
| 2017/0291253 | A1* | 10/2017 | Hahnlen ............... B23K 11/115 |

OTHER PUBLICATIONS

Joesbury, "New Approaches to Composite Metal Joining", PhD Thesis, Cranfield University (Nov. 2015). (Year: 2015).*
Compositence, "Composite Production Using Prepreg Materials", Compositence GmbH, http://www.compositence.com/en/fiber-placement/innovation/prepreg/, (May 16, 2016). (Year: 2016).*

* cited by examiner

HIGH STRENGTH MECHANICAL FASTENING INCLUSIONS FOR FIBER REINFORCED POLYMER STRUCTURES

BACKGROUND

Fiber reinforced polymers, such as carbon fiber reinforced polymers (CFRP) and glass fiber reinforced polymers (GFRP) composites ("composites"), are often joined to one or more other structures to complete an assembly. These other structures, to which the composites are joined, may include a frame member, such as a metal structure, or other component that can be made from similar or dissimilar material as resin plies of the fiber reinforced polymer. Joining of the composites to other structures is currently accomplished through adhesive bonding, mechanical fastening, or a combination thereof.

Adhesive joining on its own is well established. However, the adhesive does not engage to the fibers within the composite, and these methods are therefore limited to the strength of the composite's matrix material. Adhesive joints often require clean or pre-treated faying surfaces for both components being joined, require time or a pre-cure to fix components in place prior to the development of a full strength bond, and can require large joint areas to transfer the required load through a shear carrying joint design.

Mechanical fastening may be used in a so-called "potted in" or "insert" process by making a hole through the thickness of a relatively thick composite, and inserting fasteners such as bolts, screws, pins, nails, rivets, etc. through the hole such that a portion of the fasteners stick out the other side of the hole for engaging with other structures. The fastener is held in-place in the hole with an adhesive. The fastener engages the full thickness of the composite and accomplishes load transfer through mechanical interlocking. However, creating a hole through the composite weakens the composite. In particular, the hole is typically formed after the composite is cured, by a machining process or by the fastener itself (e.g. a self-piercing rivet), which can result in breakage of fibers within the composite and weaken the composite. The damage caused by mechanical fasteners to both the reinforcing fibers and cured matrix may cause complete failure of the composite, or create small micro cracks acting as fracture initiation points. This requires composite components to be designed with a "knock-down factor," which is a thickening of the section required to carry the design load to account for damage occurring during the joining process. The knock-down factor increases the amount of material used, which increases part weight and cost.

In some instances, threaded fasteners may be co-molded into the composite during the lay-up and resin infusion processes. While co-molded components largely avoid the deficiencies associated with using a through hole and the stress concentration requiring the use of a knock-down factor, they currently are limited to a single piece of metal that is cured into the composite lay-up, thereby limiting their strength. However, this method also presents deficiencies since the location of the fasteners remains fixed once the resin is cured. Accordingly, the dimensional tolerance for placing these fasteners is very small and requires high precision in manufacturing parts to be joined using these fasteners.

Integrating composites into medium and high volume automobiles is difficult due to these deficiencies in the current state-of-the-art methods, which require a trade-off between the relatively low strength of adhesive-only joints and the potential damage caused by the holes required for mechanical fasteners.

BRIEF DESCRIPTION

According to one aspect, a method of making a composite structure comprises coalescing a stack of metal sheets to form a hard point, wherein a stack of flanges extends out from an edge of the hard point; interleaving layers of uncured fiber reinforced resin plies between the flanges; and curing the fiber reinforced resin plies to bind the layers to the flanges.

According to another aspect, a laminate comprises a stack of metal sheets including a coalesced hard point, a stack of flanges extending out from an edge of the hard point, and a fastener arranged on the hard point.

According to another aspect, a composite structure comprises a fiber reinforced polymer structure including cured fiber reinforced resin plies and a fastening inclusion integrated into the fiber reinforced polymer structure. The fastening inclusion comprises a stack of metal sheets including a coalesced hard point, a stack of flanges extending out from an edge of the hard point and interleaved and bonded with the cured fiber reinforced resin plies, and a fastener arranged on the hard point.

DETAILED DESCRIPTION

The present subject matter involves integrating a laminated metal structure, herein referred to as a fastening inclusion, into a fiber reinforced polymer structure prior to curing the fiber reinforced polymer structure. The fastening inclusion includes a hard point used for joining the fiber reinforced polymer structure, via a mechanical fastener, to a separate component. The fastening inclusion may be constructed using Ultrasonic Additive Manufacturing (UAM) or another suitable method to coalesce, out of a plurality of metal sheets, a single component including a stack of flanges extending our from an edge of the hard point. The flanges are utilized by being interleaved with a plurality of uncured fiber reinforced resin plies. The fiber reinforced resin plies are cured to form a composite structure, which comprises a fiber reinforced polymer structure and the hard point. Interleaving multiple flanges from the fastening inclusion within the fiber reinforced resin plies results in a strong adhesive joint between the fastening inclusion and the fiber reinforced polymer structure. Additionally, engagement of fibers from the resin plies in the load path of the fastening inclusion transfers loads from the fastening inclusion to the fiber reinforced polymer structure to contribute to joint strength.

If UAM is used to create the hard point, it is possible to embed fibers within the metal coalesced region of the hard point such that the fibers stick out of the hard point and can be utilized as the flanges for interleaving with the fiber reinforced resin plies.

Fasteners can be integrated with the hard point through various techniques, such as projection welding or UAM. This is done before or after integrating the hard point into the fiber reinforced polymer structure. If the hard point is thick enough, a threaded hole can be formed in the hard point itself, eliminating the need for an additional fastener and reducing the hard point profile. Forming threads in the hard point after curing allows for less scrap due to out-of-tolerance joining points. The fastener could also be a threaded stud to make a similarly low profile external threaded hard point. The hard point may be used with a through hole and a separate mechanical fastener for joining the composite structure with a separate component under wider dimensional tolerances.

Figure 1A:
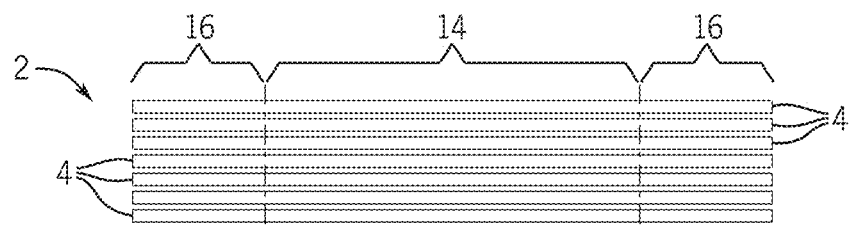
FIG. 1A is a schematic side view of a stack of metal sheets in accordance with the present subject matter.
Figure 1B:
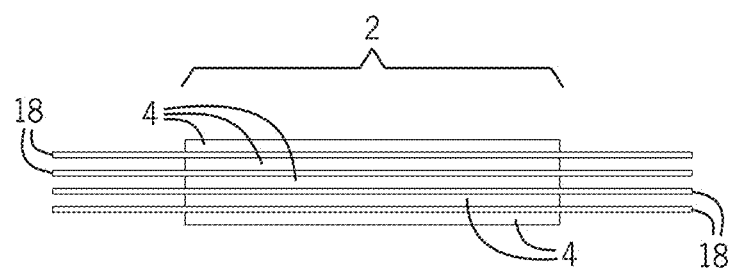
FIG. 1B is a schematic side view of a stack of metal sheets and interleaved fiber layers in accordance with the present subject matter.
Figure 2:
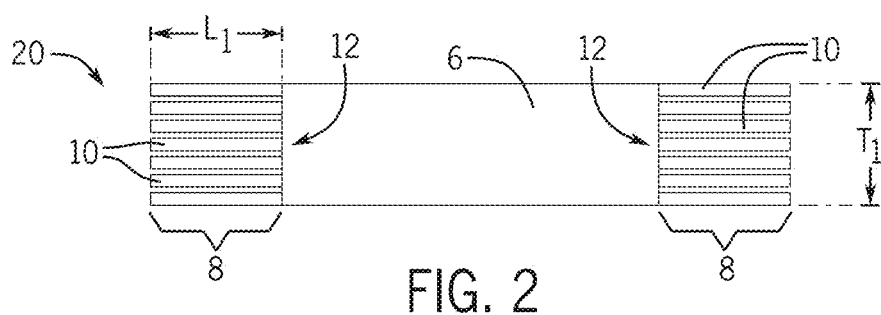
FIG. 2 is a schematic side view of a fastening inclusion in accordance with the present subject matter.

Referring now to the figures, a composite structure including a high strength mechanical fastening inclusion in a fiber reinforced polymer structure is prepared by arranging a stack 2 of metal sheets 4 one on top of another as depicted in FIGS. 1A and 1B, and coalescing the metal sheets 4 in order to form a hard point 6 having a stack 8 of flanges 10 extending out from an edge 12 of the hard point 6, as depicted in FIG. 2. The base metal of the metal sheets 4 is not particularly limited, and may include metals such as aluminum (Al), magnesium (Mg), Al-based alloys (e.g., 5000, 6000, and 7000 series aluminum alloys), Mg alloys, steels (e.g., mild steels, dual phase steels, cold formed steels), etc.

As used herein, "hard point" means a coalesced portion of the metal sheets 4. By "coalesce" or cognate terms, it is meant that the individual metal sheets 4 are merged together so as to form one mass by the use of fusion welding or solid state welding. In fusion welding, the metal base material of the metal sheets 4 is melted by means of the application of heat. The melted base material from one metal sheet 4 mixes with melted metal from other metal sheets 4 such that upon cooling, a bond is formed between metal sheets 4. Suitable fusion welding techniques include, but are not limited to, arc welding, resistance welding including resistance spot welding (RSW), oxyfuel welding, electron beam welding and laser beam welding.

In solid state welding, the joining of metal sheets 4 takes place without melting of the base metal. Solid state welding is welding which produces coalescence of joined pieces at temperatures essentially below the melting point of the base materials being joined, without the addition of filler metal. Increased temperatures above ambient may or may not be used. Solid state welding includes, but is not limited to, cold welding, diffusion welding, explosion welding, forge welding, friction welding, hot pressure welding, roll welding, and ultrasonic welding. In the case of metal sheets 4, these are coalesced by application of one or more of pressure, vibration, and heat.

The metal sheets 4 may be coalesced via Ultrasonic Additive Manufacturing (UAM), which is ultrasonic welding of metal sheets 4 to one another, to form an ultrasonic welded hard point 6. UAM is a solid-state (i.e. no melting) metal welding process, which provides fully dense, gapless three dimensional parts. In the ultrasonic welding process, an ultrasonic welder may be used, which includes a sonotrode (e.g. a horn) driven by one or more piezoelectric transducers to impart ultrasonic vibrations under a compressive force to metal parts to be joined. The sonotrode operates at a vibration frequency of about 20 kHz (nominal) that is transverse to the metal parts to create plastic deformation between the metal parts being welded. When two metal parts are being ultrasonically welded, vibrations imparted by the sonotrode on the metal parts, along with a static compressive force, cause a metallurgical bond to form between the two metal parts. Process temperatures are low, typically below 150° C., and thus inhibit the formation of brittle intermetallics, inhibit altering the microstructure of the metals, and inhibit heat-induced distortion or property degradation of the metals.

Ultrasonic welding is useful for coalescing the metal sheets 4 because it is a low temperature process, meaning that it will not alter the effect of prior heat treatments or the microstructure of the metal sheets 4 on a meso- or macro-scale, and is able to join dissimilar metal materials without formation of adverse intermetallic compounds. Ultrasonic welding produces a continuous hermetic bond at the joint between two metal sheets 4. As will be discussed in more detail, ultrasonic welding can be used for embedding fibers between the metal sheets 4 such that they are embedded within the hard point 6 to act as flanges 10.

The thickness of the metal sheets 4 is not particularly limited, and may each be for example, 0.05-5 mm thick, 0.75-3.5 mm thick, 0.1-2.0 mm thick, 0.9-1.1 mm thick, or 1.0±0.05 mm thick. The number of metal sheets 4 is not particularly limited, and 2-50, 5-40, 7-30, 10-20, 14-16, or 15 metal sheets 4 may be coalesced to form the hard point 6. The thickness $T_1$ (FIG. 2) of the hard point 6 is not particularly limited, and may correspond to a thickness of the fiber reinforced polymer structure 22 (FIG. 3) in which the hard point 6 is incorporated. In this way, the hard point 6 engages the entire thickness $T_2$ of the fiber reinforced polymer structure 22, creating a strong joint therewith such that the entire thickness $T_2$ of the fiber reinforced polymer structure 22 is engaged with load transfer. The thickness $T_1$ may also depend on the number and thickness of the metal sheets 4 that are used. The thickness $T_1$ of the hard point 6 may be from 1-10 mm or more or less. For structural vehicle components, the thickness $T_1$ of the hard point 6 may be 2-8 mm, 3-6 mm, or 4.5±0.5 mm. For non-structural vehicle components, the thickness $T_1$ of the hard point 6 may be 0.05-4 mm, 0.1-2.0 mm, 0.5-1.5 mm, or 1.0±0.1 mm.

In one non-limiting embodiment, the flanges 10 may be formed from portions of the metal sheets 4 that have not been coalesced. With particular reference to FIG. 1A, the metal sheets 4 are continuous and may be coalesced for example, by directing vibrations produced by a sonotrode from an ultrasonic welder to only certain portions, e.g. central portion 14, of the metal sheets 4 so that only the central portion 14 of the metal sheets 4 coalesce with each other. Other portions, e.g. outer portions 16, of the metal sheets 4 not subject to the ultrasonic vibrations do not coalesce and thus remain separate, distinct, and separable from one another and can act as flanges 10. The hard point 6 and stack 8 of flanges 10 comprise the fastening inclusion 20.

Figure 8:
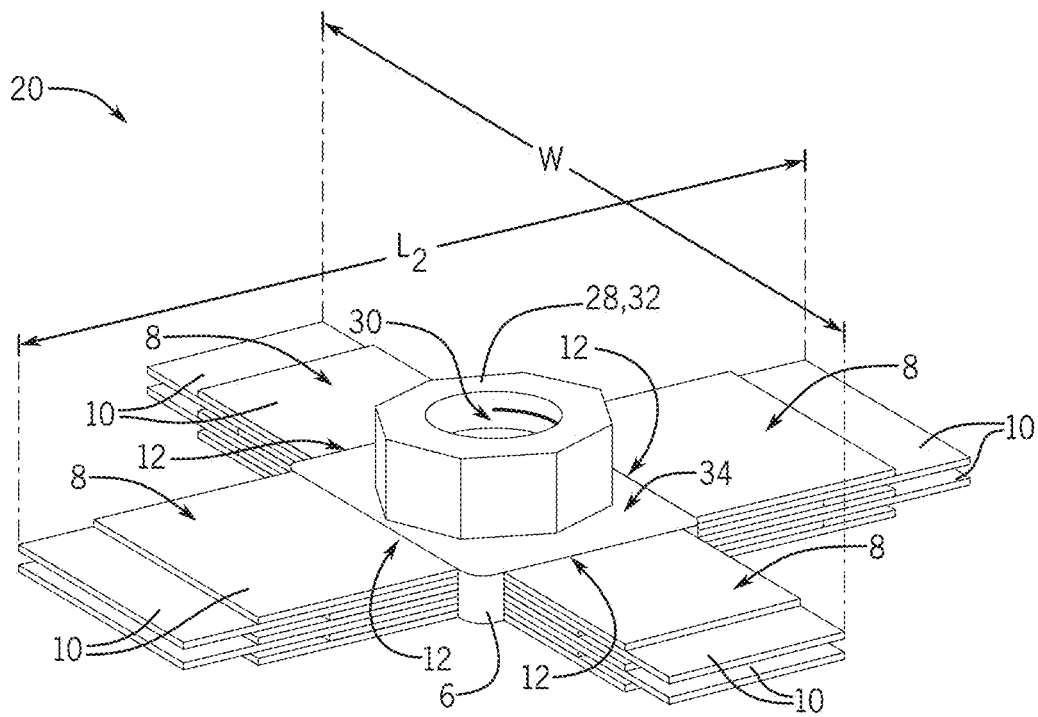
FIG. 8 is a perspective view of the fastening inclusion of FIG. 4.
Figure 9:
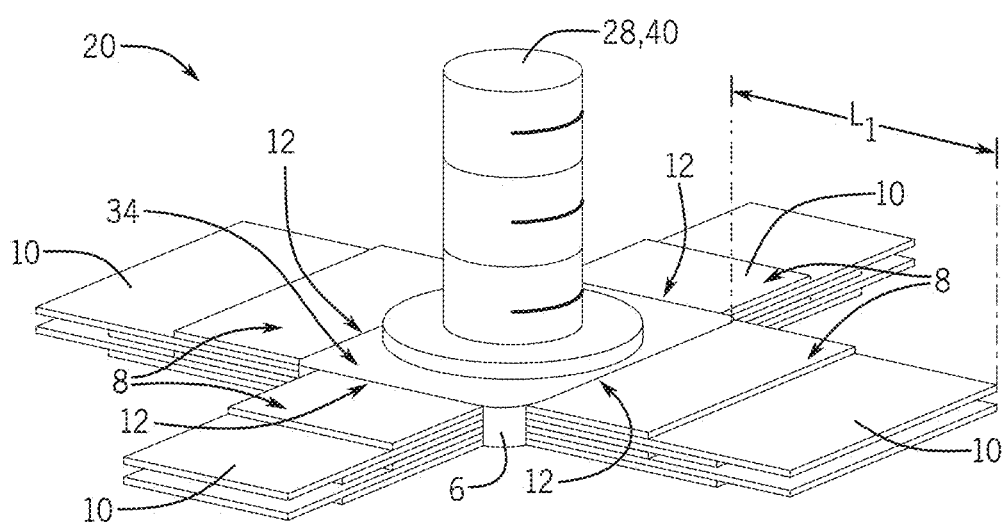
FIG. 9 is a perspective view of the fastening inclusion of FIG. 6.

Between FIGS. 1A and 2, the central portion 14 of the metal sheets 4 are depicted as being coalesced into the hard point 6, while the non-coalesced outer portions 16 of the metal sheets 4 form the stack 8 of flanges 10 that extend from the edges 12 of the hard point 6. As will be discussed in more detail herein, the flanges 10, because they are not coalesced together, can therefore be used to interleave with the fiber reinforced resin plies. Multiple flanges 10 enable a greater strength within the composite structure 24 and a greater interface strength between the fastening inclusion 20 and the fiber reinforced polymer structure 22 than conventional co-molded fasteners. As depicted in FIG. 2, the extending from either edge 12 of the hard point 6, and FIGS. 8 and 9 show four stacks 8 of flanges 10, one extending from each edge 12 of the hard point 6. However, it should be appreciated that the fastening inclusion 20 can include more or less stacks 8 of flanges 10 than are depicted in the figures.

With particular reference to FIG. 1B, the flanges 10 may also be formed from fiber layers 18. The fiber layers 18 may be glass fibers or carbon fibers, and are interleaved between the metal sheets 4 in the stack 2 before the metal sheets 4 are coalesced. Between FIGS. 1B and 2, substantially the entirety of the metal sheets 4 are depicted as being subject to ultrasonic welding, thereby forming the hard point 6 with ends of the embedded fiber layers 18 (FIG. 1B) forming the stack 8 of flanges 10 (FIG. 2) extending from the edges 12 of the hard point 6. If ultrasonic welding is used to coalesce the metal sheets 4, the base metal from the metal sheets 4 may infiltrate into the fiber layers 18 thereby creating an integral and secure bond with the fibers of the fiber layers 18. In this embodiment, the flanges 10 may consist of the fiber layers 18 only, and the hard point 6 may consist of the coalesced metal sheets 4 and the fiber layers 18. Some portion of the hard point 6 may be devoid of embedded fiber layers 18 to allow for joining to the hard point 6 to another structure 36 (FIG. 5) without damaging the fiber layers 18. In other words, a through hole 30, bolt 40, or weld can be arranged on the hard point 6 in the area that does not include the fibers from the fiber layers 18, e.g. a central portion of the hard point 6, in order to avoid damaging those fibers from the fiber layers 18 when attaching the fastener 28 to the hard point 6 or when making the joint 46.

As depicted in FIG. 2, a fastening inclusion 20 therefore includes a hard point 6 with a stack 8 of flanges 10 extending from edges 12 of the hard point 6. The fastening inclusion 20, may be incorporated into a multi-layered fiber reinforced polymer structure 22 for use in attaching the multi-layered fiber reinforced polymer structure 22 to another structure, for example a metal frame member.

Figure 3:
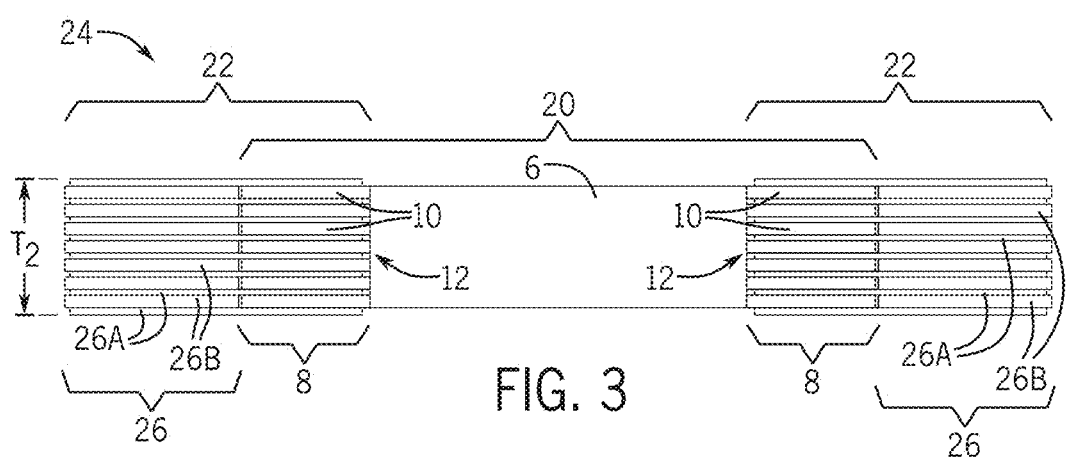
FIG. 3 is a schematic side view of a composite structure including the fastening inclusion of FIG. 2 in accordance with the present subject matter.

With reference to FIG. 3, the fastening inclusion 20 may be incorporated into a fiber reinforced polymer structure 22 to form a composite structure 24. The fastening inclusion 20 may be incorporated into the fiber reinforced polymer structure 22 during lay-up of fiber reinforced resin plies 26, and before curing of the fiber reinforced resin plies 26. In one non-limiting embodiment, the flanges 10 are interleaved with the uncured fiber reinforced resin plies 26. Thereafter, the fiber reinforced resin plies 26 are cured, which forms a bond between the flanges 10 and the plies 26, and therefore between the fastening inclusion 20 and the fiber reinforced polymer structure 22 to thereby produce the composite structure 24. The fiber reinforced resin plies 26, which are cured to make the fiber reinforced polymer structure 22, are not particularly limited. In one non-limiting embodiment, the fiber reinforced resin plies 26 may include carbon fibers pre-impregnated with an uncured polymer material (i.e. "prepreg" carbon fibers). In another non-limiting embodiment, the fiber reinforced resin plies 26 may include plain carbon fibers that are first interleaved between the flanges 10, then infiltrated (e.g. by injection molding, resin transfer molding, vacuum bagging, compression molding) with an uncured polymer material (e.g. epoxy), and then the polymer material is cured to bond the fibers to the flanges 10. Curing of the fiber reinforced resin plies 26 provides adhesion between the plies 26 and the flanges 10, and can be accomplished by any resin curing process.

In a non-limiting example, the fiber reinforced polymer structure 22 includes a first type of plies 26A and a second type of plies 26B. Plies 26A extend between the flanges 10, while plies 26B are arranged between plies 26A and abut ends of the flanges 10. Plies 26B have a thickness similar to the thickness of the flanges 10 and are used to space apart plies 26A so that the fiber reinforced polymer structure 22 has a thickness $T_2$ similar to the thickness $T_1$ of the hard point 6, which is the thickness of the fastening inclusion 20. The thickness $T_1$ of the hard point 6 can match the thickness $T_2$, thus allowing for use of the fastening inclusion 20 in a fiber reinforced composite structure having any thickness $T_2$.

The fastening inclusion 20 may be surrounded by the fiber reinforced polymer structure 22, or the fastening inclusion 20 may be located at an edge of the fiber reinforced polymer structure 22.

A fastener 28 may be arranged on the hard point 6 for use in connecting the composite structure 24 to a separate component 36, such as a metal frame member in a vehicle for example. The fastener 28 is not particularly limited, and may include a nut, a bolt, eyelet, a clasp, a screw, a post, a rivet, a bracket, a wedge, a clip, or the like.

The fastener 28 may be arranged on the hard point 6 either before or after the fastening inclusion 20 is incorporated into a fiber reinforced polymer structure 22. This configuration integrates a mechanical fastener 28 in the hard point 6 and not within the fiber reinforced polymer structure 22. As such, the fastener 28 is integrated without adversely affecting the strength of the fiber reinforced polymer structure 22 by way of crack initiation or propagation associated with conventional systems. This greatly reduces or eliminates the need for the fiber reinforced polymer structure 22 to be designed with a knock-down factor.

Figure 4:
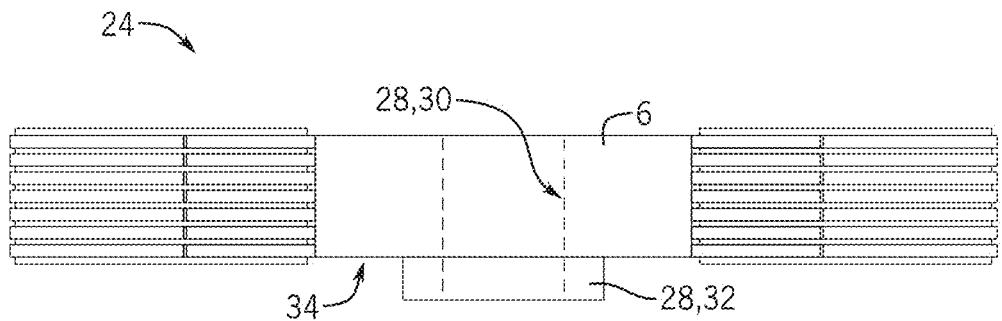
FIG. 4 is a schematic side view of the composite structure of FIG. 3 including a fastener in accordance with the present subject matter.
Figure 5:
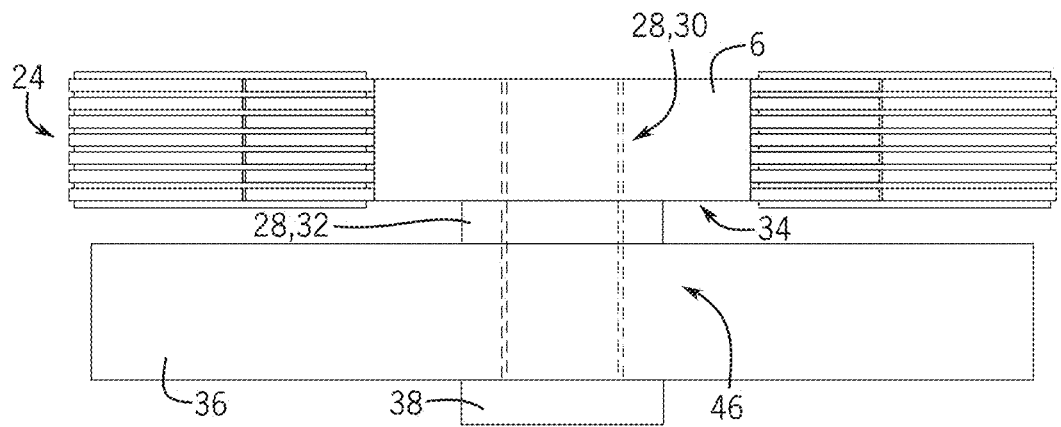
FIG. 5 is a schematic side view of an assembly including the composite structure of FIG. 4 in accordance with the present subject matter.

With reference to FIGS. 4, 5 and 8, the fastener 28 includes a through hole 30 extending through the thickness $T_1$ of the hard point 6, and a threaded nut 32 arranged on a surface 34 of the hard point 6 and aligned with the through hole 30. As depicted in FIG. 5, the nut 32 and though hole 28 may be used to mechanically attach the composite structure 24 to a separate component 36 by using a corresponding bolt 38 associated with the component 36. The nut 32 may be welded or otherwise attached to the hard point 6 and the through hole 30 may be machined into the hard point 6. Alternatively, the through hole 30 may be formed by preformed holes that are present in each of the metal sheets 4 before they are coalesced. In this aspect, when the metal sheets 4 having the preformed holes are coalesced, the preformed holes are aligned to form the through hole 30.

In an alternative embodiment, a nut 32 is not included. In one aspect, the through hole 30 is itself threaded and can therefore threadingly engage the bolt 38. In this aspect, the hard point 6 may have a thickness $T_1$ that is great enough such that a nut 32 is not necessary, and a threaded through hole 30 may be formed in the hard point 6 since the hard point 6 is robust enough to properly engage with an associate bolt 32. In another aspect, a nut is separate and distinct from the hard point 6, and is threadingly engaged to the bolt 24 on the side of the hard point 6 opposite from the component 36 to create a compression fitting around the hard point 6.

Figure 6:
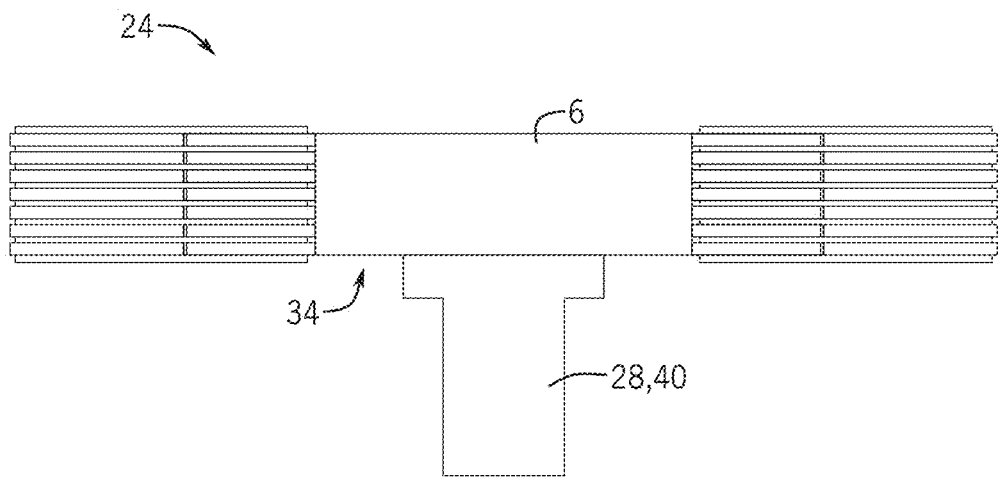
FIG. 6 is a schematic side view of the composite structure of FIG. 3 including another fastener in accordance with the present subject matter.
Figure 7:
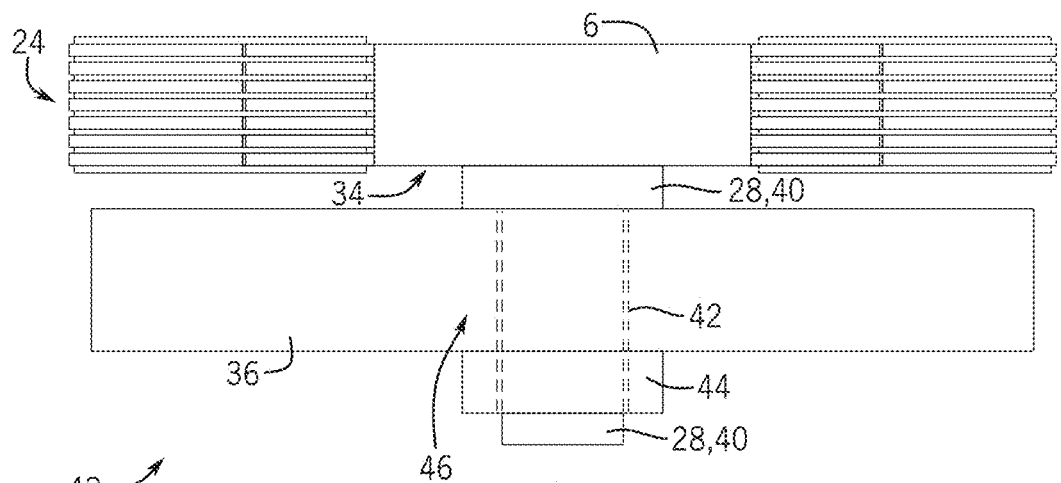
FIG. 7 is a schematic side view of an assembly including the composite structure of FIG. 6 in accordance with the present subject matter.

With reference to FIGS. 6, 7, and 9, the fastener 28 includes a threaded bolt 40 arranged on the surface 34 of the hard point 6. As depicted in FIG. 7, the bolt 40 may be used to mechanically attach the composite structure 24 to a separate component 36 by using a corresponding nut 44 associated with the component 36. The bolt 40 may be welded (such as by UAM) or otherwise attached to the hard point 6 and inserted through an aperture 42 in the component 36 and threadingly engaged to the nut 44 to create a compression fitting around the component 36.

As seen in FIGS. 8 and 9, the fastening inclusion 20 has a generally square or rectangular shape and thus includes four edges 12 and four stacks 8 of flanges 10, wherein one stack 8 of flanges 10 projects out from each of the four edges 12. As should be understood, the fastening inclusion 20 can be differently shaped, have more or less edges and more or less stacks of flanges. In each stack 8 of flanges 10, the individual flanges 10 have staggered lengths $L_1$ relative to each other. Although these staggered lengths $L_1$ are not shown in FIGS. 1-7 and instead the flanges 10 are shown to have substantially the same lengths $L_1$, it will be understood that the flanges 10 depicted in FIGS. 1-7 can have staggered lengths $L_1$ as well.

The joint 46 between the composite structure 24 and the separate component 36 using the fastener 28 may be arranged differently. However, in each instance, the hard point 6 allows for a secure and sturdy joint 46 to be formed between the composite structure 24 and the separate component 36 since the hard point 6 comprises coalesced metal sheets 4 and is securely attached to the fiber reinforced polymer structure 22 by interleaving the flanges 10 with the fiber reinforced resin plies 26. The assembly 48 formed by joining the composite structure 24 and the separate component may be a vehicle assembly, for example. In one non-limiting example, the composite structure 24 comprises a vehicle outer panel and the separate component 36 comprises a metal component such as a vehicle frame member.

The hard point 6 can be sized to accommodate variations in the manufacturing process such as a location variance on mating parts. This increases the tolerance of joint placement and reduces the scrap rate due to out-of-tolerance joint locations. The size of the fastening inclusion 20 and hard point 6 allows for an increased degree of manufacturing tolerance, since the fastener 28 can be attached to the hard point at a location that accurately mates with the associated fastener of the separate component 36. In other words, the hard point 6 may be sized such that the fastener 28 can be arranged on the hard point 6 at a location other than in the center of the hard point 6 as depicted in the figures, and instead can instead be arranged nearer to any edge of the hard point 6. In this regard and with reference to FIG. 8, the fastening inclusion 20 may have a length $L_2$ and width W each independently of 5-1000 mm, 10-100 mm, 15-25 mm, or 20 mm±1 mm. The fastening inclusion 20 may be an elongated structure having one of a length $L_2$ or width W that is two, three, or more times the other dimension. Such an inclusion 20 may be arranged along an entire edge of a fiber reinforced polymer structure 22, and may include a corresponding elongated hard point 6 with one or more fasteners 28 arranged along a length of the hard point 6.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of making a composite structure, comprising:
   coalescing a stack of metal sheets to form a hard point and a stack of flanges extending out from an edge of the hard point;
   interleaving uncured fiber reinforced resin plies between the flanges extending out from the edge of the hard point; and
   curing the fiber reinforced resin plies to bind the fiber reinforced resin plies to the flanges extending out from the edge of the hard point;
   wherein coalescing includes solid state welding of the metal sheets.

2. The method of claim 1, wherein the solid state welding includes ultrasonic welding of the metal sheets.

3. The method of claim 1, wherein the flanges are formed by portions of the metal sheets that have not been coalesced.

4. The method of claim 1, wherein:
   the method further includes before coalescing, interleaving fiber layers between the metal sheets;
   the fiber layers are embedded in the hard point by coalescing; and
   ends of the fiber layers extend out from the edge of the hard point to thereby define the flanges extending out from the edge of the hard point.

5. The method of claim 1, further comprising arranging a fastener on the hard point.

6. The method of claim 5, wherein the fastener includes a hole extending through the hard point.

7. The method of claim 5, wherein the fastener includes a threaded nut.

8. The method of claim 5, wherein the fastener includes a threaded bolt.

9. The method of claim 5, further comprising attaching a metal component to the fastener.

10. A method of making a composite structure, comprising:
    coalescing a stack of metal sheets to form a hard point and a stack of flanges extending out from an edge of the hard point;
    interleaving uncured fiber reinforced resin plies between the flanges extending out from the edge of the hard point; and
    curing the fiber reinforced resin plies to bind the fiber reinforced resin plies to the flanges extending out from the edge of the hard point;
    wherein the flanges are formed by portions of the metal sheets that have not been coalesced.

* * * * *